March 19, 1935.  L. W. RIGGS  1,995,157
MOTOR CONTROL SYSTEM
Filed Feb. 14, 1934
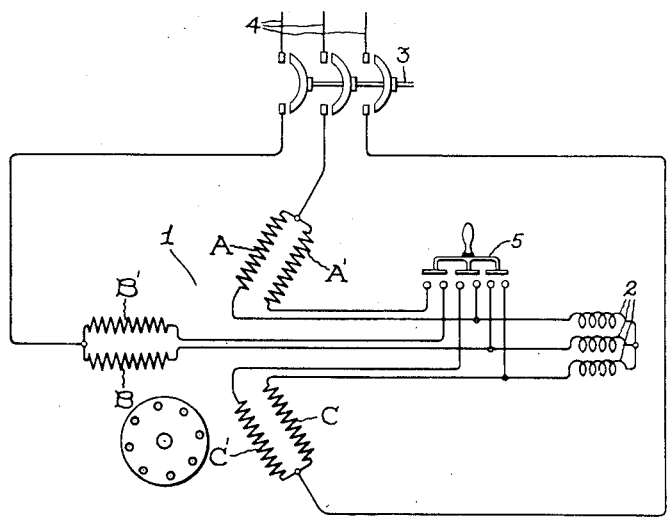
Inventor:
Leland W. Riggs,
by Harry E. Dunham
His Attorney.

Patented Mar. 19, 1935

1,995,157

UNITED STATES PATENT OFFICE 1,995,157

MOTOR CONTROL SYSTEM

Leland W. Riggs, Schenectady, N. Y., assignor to General Electric Company, a corporation of New York Application February 14, 1934, Serial No. 711,137

4 Claims. (Cl. 172—274)

My invention relates to a motor control system and particularly to an arrangement of apparatus for starting a multiple primary circuit polyphase motor by energizing only one of the polyphase primary circuits thereof with an impedance in series therewith and then energizing all of the primary windings in parallel. An object of my invention is to provide an improved arrangement of apparatus for accomplishing this result.

In accordance with my invention, I connect a single switch, having the same number of poles as each primary winding has phases so that when it is closed it short-circuits the series impedance used during starting and also connects a second primary circuit in parallel with the primary circuit used when starting.

My invention will be better understood from the following description when taken in connection with the accompanying drawing the single figure of which diagrammatically illustrates a motor control system embodying my invention, and its scope will be pointed out in the appended claims.

Referring to the drawing, 1 represents a three-phase motor having two three-phase primary windings ABC and A'B'C' arranged in any suitable manner, examples of which are well known in the art so that the motor starting current is materially less when only one of these windings is energized to start the motor than it would be if both windings were simultaneously energized to start the motor. While I have shown a three-phase motor, it is evident that my invention is applicable to motors having $n$ phases where $n$ represents any number.

Permanently connected between a common point and one terminal of each of the phase windings of one of the windings such as winding ABC is respectively connected a winding of the three-phase reactor 2. The other terminals of the winding ABC are arranged to be connected by means of a suitable switch 3 to a three-phase supply circuit 4. Therefore, when the switch 3 is closed, the phase windings of the winding ABC are connected in star across the supply circuit 4 with the reactor 2 in series therewith.

The line terminals of the winding A'B'C' are permanently connected to the corresponding line terminals of the winding ABC but the other terminals are normally disconnected from each other and from the corresponding terminals of ABC. Therefore, during the starting operation the primary winding A'B'C' is not energized although the line terminals thereof are connected to the supply circuit 4. In order to connect this other primary winding A'B'C' in parallel with the other winding ABC, I provide a three-pole switch 5 of any suitable type which, when closed, connects the neutral terminals of all of the phase windings together. This result is accomplished by connecting the three movable contacts of the three-pole switch 5 together so that they form a common neutral.

While I have shown the switch 5 as a manually controlled device, it is obvious that it may be controlled in any well known manner, examples of which are well known in the art, so that it is closed at the proper time during the starting operation of the motor.

From the above description of my invention, it will be obvious that I have provided a single switch 5 which has the same number of poles as the primary winding has phases and which, when closed, short-circuits the starting reactor and connects a second primary winding in parallel with the primary winding used during starting.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, an alternating current supply circuit having $n$ phases, an alternating current motor having a star connected primary winding of $n$ phases, an impedance connected between certain of said phase windings and the neutral point of the star connected windings, switching means for connecting said phase windings to said circuit, a second primary winding of $n$ phases on said motor, each phase winding of said second primary winding having one terminal thereof permanently connected to the supply circuit terminal of the corresponding phase winding of said star connected primary winding, and a single $n$ pole switch for connecting all of the other terminals of said second primary winding and all of the neutral terminals of said star connected winding directly together.

2. In combination, a three-phase supply circuit, a three-phase motor having a three-phase star connected primary winding, an impedance connected between certain of said phase windings and the neutral point of the star connected windings, switching means for connecting said star connected winding to said circuit, a second three-phase primary winding on said motor, each phase winding of said second winding having one terminal thereof permanently connected to the corresponding supply circuit terminal of said star connected primary winding and a single three pole switch for short-circuiting said impedances and for connecting all of the phase windings together so as to form a common neutral.

3. In combination, a three-phase supply circuit, a three-phase motor having a three-phase star connected primary winding, an impedance connected between certain of said phase windings and the neutral point of the star connected windings, switching means for connecting said star connected winding to said circuit, a second three-phase primary winding on said motor, each phase winding of said second winding having one terminal thereof permanently connected to the corresponding supply circuit terminal of said star connected primary winding, and a single three pole switch having three movable contacts electrically connected together and a pair of stationary contacts arranged to be simultaneously engaged by each movable contact, said stationary contacts being respectively connected to different neutral terminals of said phase windings.

4. In combination, an alternating current supply circuit having $n$ phases, an alternating current motor having a star connected primary winding of $n$ phases, an impedance connected between certain of said phase windings and the neutral point of the star connected winding, switching means for connecting said phase windings to said circuit, a second primary winding of $n$ phases on said motor, each phase winding of said second primary winding having one terminal thereof permanently connected to the supply circuit terminal of the corresponding phase winding of said star connected primary winding and a single switch having two $n$ stationary contacts respectively connected to different neutral terminals of said phase windings and movable contact means for electrically connecting all of said stationary contacts together.

LELAND W. RIGGS.